(12) United States Patent
Fujioka (10) Patent No.: US 10,632,792 B2
(45) Date of Patent: Apr. 28, 2020

(54) PNEUMATIC TIRE

(71) Applicant: Toyo Tire & Rubber Co., Ltd., Osaka-shi, Osaka (JP)

(72) Inventor: Tsuyoshi Fujioka, Osaka (JP)

(73) Assignee: TOYO TIRE CORPORATION, Osaka (JP)

( * ) Notice: Subject to any disclaimer, the term of this patent is extended or adjusted under 35 U.S.C. 154(b) by 413 days.

(21) Appl. No.: 15/620,989

(22) Filed: Jun. 13, 2017

(65) Prior Publication Data
US 2018/0001707 A1 Jan. 4, 2018

(30) Foreign Application Priority Data
Jun. 30, 2016 (JP) .................................. 2016-130585

(51) Int. Cl.
*B60C 11/01* (2006.01)
*B60C 13/00* (2006.01)
*B60C 11/03* (2006.01)
*B60C 13/02* (2006.01)

(52) U.S. Cl.
CPC .......... *B60C 11/01* (2013.01); *B60C 11/0306* (2013.01); *B60C 13/003* (2013.01); *B60C 13/02* (2013.01)

(58) Field of Classification Search
CPC ...... B60C 11/01; B60C 11/0306; B60C 13/02
See application file for complete search history.

(56) References Cited

U.S. PATENT DOCUMENTS

2009/0107600 A1* 4/2009 Missik-Gaffney ...... B60C 11/01
152/209.16
2010/0288409 A1 11/2010 Ohara
2013/0139936 A1* 6/2013 Ohara ................... B60C 13/02
152/209.11

FOREIGN PATENT DOCUMENTS

JP 2016-88338 A 5/2016

OTHER PUBLICATIONS

Office Action dated Dec. 21, 2018, issued in counterpart CN Application No. 201710440993.8, with English machine translation. (10 pages).

(Continued)

*Primary Examiner* — Jacob T Minskey
*Assistant Examiner* — Melody Tsui
(74) *Attorney, Agent, or Firm* — Westerman, Hattori, Daniels & Adrian, LLP (57) ABSTRACT

A pneumatic tire includes a sidewall portion having an outer wall surface that is provided with a first protrusion extending to have an annular shape in a tire-circumferential direction, and a plurality of second protrusions disposed at intervals in the tire-circumferential direction. The first protrusion is provided, in a tire-radial direction, in a region having a range of 80% of a length H from a tire-maximum-width position to a tire-outermost-diameter point in the tire-radial direction with the tire-maximum-width position as the center. The second protrusion is provided with a connection portion that extends in the tire-circumferential direction and is connected to the first protrusion on the outer side in the tire-radial direction, and a pair of radial projection portions that projects outward in the tire-radial direction from both end portions of the connection portion in the tire-circumferential direction and is disposed at an interval in the tire-circumferential direction.

14 Claims, 5 Drawing Sheets

(56) References Cited

OTHER PUBLICATIONS

Office Action dated May 29, 2019, issued in counterpart CN Application No. 201710440993.8, with English machine translation. (10 pages).

* cited by examiner

PNEUMATIC TIRE

BACKGROUND OF THE INVENTION

Field of the Invention

The embodiment relates to a pneumatic tire.

Background Art

In the related art, as a pneumatic tire for rough-road running purposes, a technique of forming a plurality of protrusions disposed on a sidewall portion at intervals in a tire-circumferential direction has been known (refer to US 2013/139936 A1 and US 2010/283409 A1). When the tire sinks into muddy terrain, the protrusions are provided to produce traction due to shear resistance so as to secure drive performance on the muddy terrain. Otherwise, the protrusions are considered to improve external damage resistance obtained during driving on a rough road.

However, in US 2013/139936 A1 and US 2010/288409 A1, the protrusions are provided in, as a region of the sidewall portion on an outer side in a tire-radial direction, a buttress portion that is adjacent to a ground-contact end of a tread portion. Therefore, a region in the vicinity of a position, at which the tire has the maximum width and which is likely to receive an external force and to be damaged, is not sufficiently protected, and thus there is room for improvement in the external damage resistance obtained during the driving on the rough road.

In consideration of such circumstances described above, an abject of the embodiment is to provide a pneumatic tire that is capable of achieving improvement in external damage resistance while securing traction performance on muddy terrain.

SUMMARY OF THE INVENTION

According to the embodiment, there is provided a pneumatic tire including: a pair of bead portions; a pair of sidewall portions which extends outward from the bead portions in a tire-radial direction; and a tread portion which connects both outer ends of the sidewall portions to each other in a radial direction thereof. An outer wall surface of the sidewall portion is provided with a first protrusion extending to have an annular shape in a tire-circumferential direction, and a plurality of second protrusions disposed at intervals in the tire-circumferential direction on an outer side of the first protrusion in the tire-radial direction. The first protrusion is provided, in the tire-radial direction, in a region having a range of 80% of a length H from a tire-maximum-width position to a tire-outermost-diameter point in the tire-radial direction with the tire-maximum-width position as the center. The second protrusion is provided with a connection portion that extends in the tire-circumferential direction and is connected to the first protrusion on the outer side in the tire-radial direction, and a pair of radial projection portions that projects outward in the tire-radial direction from both end portions of the connection portion in the tire-circumferential direction and is disposed at an interval in the tire-circumferential direction.

DETAILED DESCRIPTION OF THE INVENTION

Figure 1:
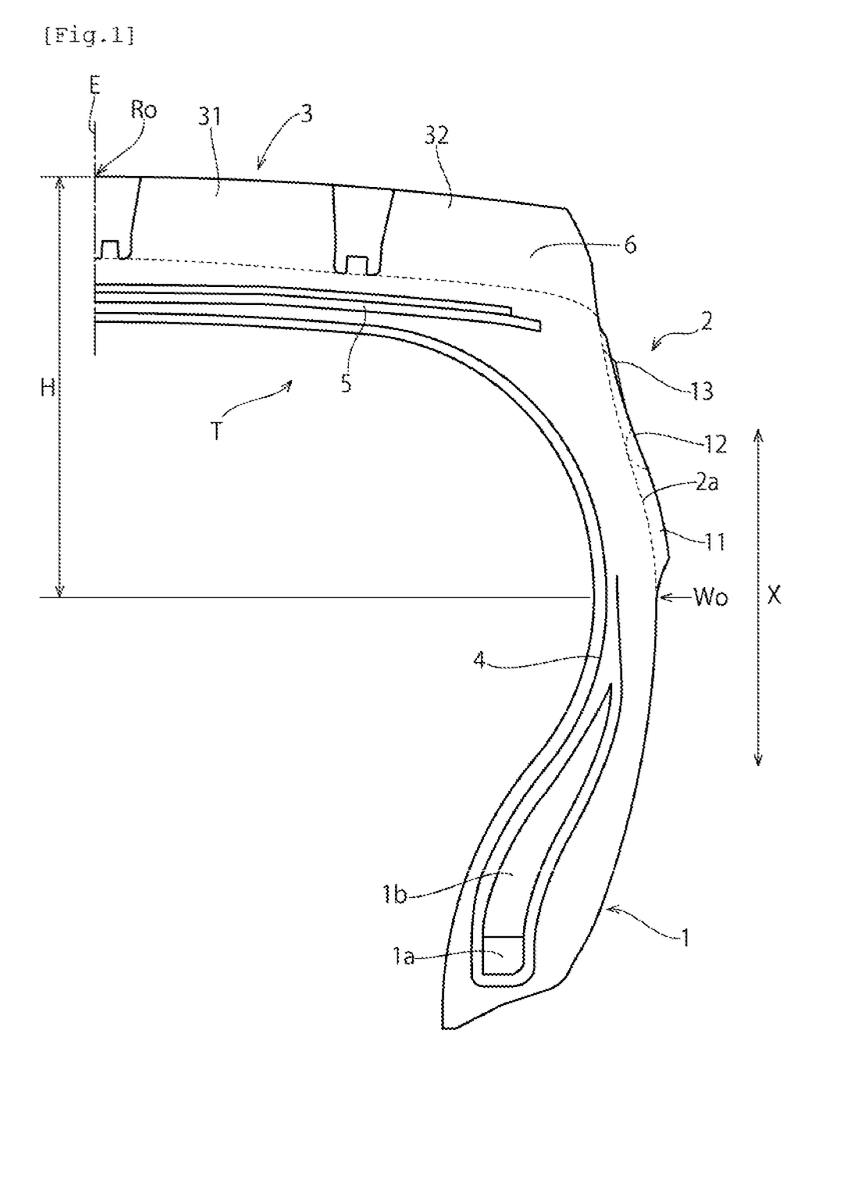
FIG. 1 is a sectional view taken along the meridian of a tire so as to illustrate an example of a manufactured pneumatic tire according to an embodiment.

Hereinafter, an embodiment of the invention will be described with reference to the accompanying figures. FIG. 1 is a sectional view taken along the meridian of a tire so as to illustrate an example of a pneumatic tire T according to the embodiment and illustrates only a right half thereof.

The pneumatic tire T is an off-road pneumatic tire for running purposes on a rough road including a rocky stretch or muddy terrain, and includes a pair of bead portions 1, sidewall portions 2 which extend outward from the bead portions 1 in a tire-radial direction, respectively, and a tread portion 3 which connects both outer ends of the sidewall portions 2 to each other in the tire-radial direction thereof. The bead portion 1 is provided with an annular bead core 1a and a bead filler 1b. A toroidal carcass 4 is disposed between the pair of bead portions 1. An end portion of the carcass 4 is folded via the bead core 1a. The carcass 4 is formed by coating, with topping rubber, ply cords arranged in a direction that is substantially orthogonal to a tire-circumferential direction. Steel cords or organic fiber cords are appropriately used as the ply cords.

Belts 5, which are each formed of two sheets of plies stacked on inner and outer sides, are stacked in outer circumference of the carcass 4 of the tread portion 3, and tread rubber 6 is provided in further outer circumference therefrom. The belt 5 is formed of one or a plurality of steel belt layers in which steel cords are arranged at an angle of 10° to 35° with respect to the tire-circumferential direction. In this example, the belt 5 is formed of two steel belt layers.

The tread portion 3 is provided with a main groove extending in the tire-circumferential direction and a plurality of blocks comparted by transverse grooves 7 extending to intersect with the main groove in a front surface of the tread rubber 6.

Figure 2:
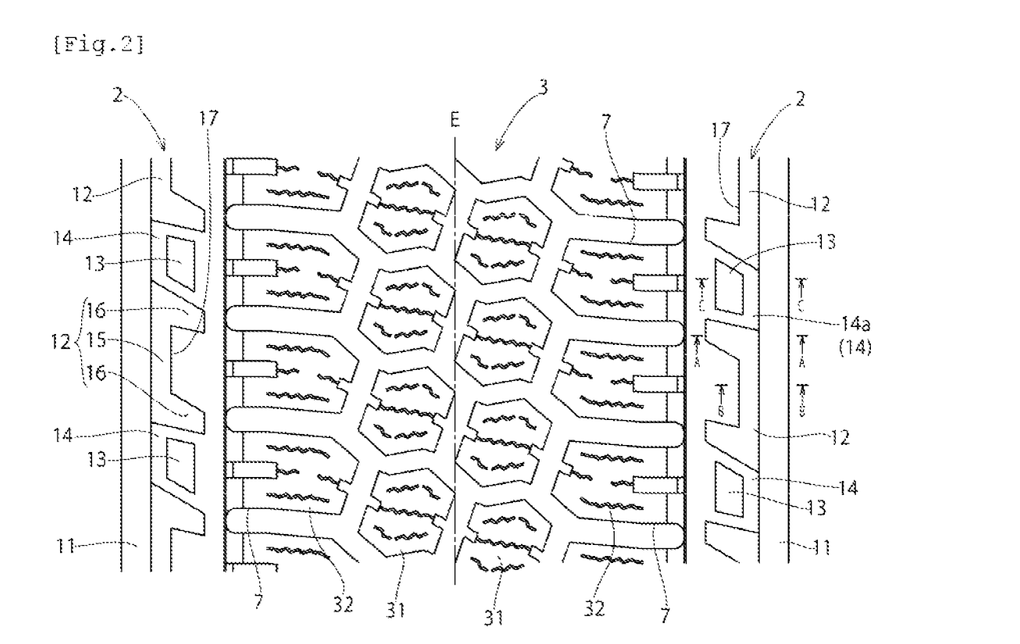
FIG. 2 is a development view illustrating main parts of the pneumatic tire in FIG. 1.

In this example, as illustrated in FIG. 2, the tread portion 3 is provided with four block rows of a pair of central block rows 31 and 31 and a pair of shoulder block rows 32 and 32. The pair of central block rows 31 and 31 is disposed on both sides with the tire equatorial plane E interposed therebetween. The pair of shoulder block rows 32 and 32 is disposed in a ground-contact end region (shoulder region) on both sides of the central block rows 31 and 31. However, there is no particular limitation on a tread pattern of the pneumatic tire of the invention.

An outer wall surface 2a of the sidewall portion 2 is provided with a first protrusion 11 extending to have an annular shape in the tire-circumferential direction, and a plurality of second protrusions 12 disposed at intervals in the tire-circumferential direction on an outer side of the first protrusion 11 in the tire-radial direction. A gap portion 14 is comparted between second protrusions 12 adjacent to each other in the tire-circumferential direction, and a third protrusion 13 is provided in the gap portion 14. Note that the protrusions 11, 12, and 13 are provided on the outer wall surface 2a of the at least one sidewall portion 2; however, it is preferable that the protrusions are provided on both of the sidewall portions 2 in consideration of improvement in traction performance and external damage resistance on muddy terrain.

The first protrusion 11 is provided to fit, in a tire-radial direction, in a region X having a range of 80% of a length H from a tire-maximum-width position Wo to a tire-outermost-diameter point Ro in the tire-radial direction with the tire-maximum-width position Wo as the center (refer to FIG. 1). The first protrusion 11 has a raised height T1 from the outer wall surface 2a of the sidewall portion 2 and is an annular protrusion that is provided to have substantially constant sizes without a change in the tire-radial direction and in the tire-circumferential direction and is continuous in the tire-circumferential direction.

Here, the tire-maximum-width position Wo is a position in a tire-radial direction at which a tire-cross-sectional width is obtained in a normal state of no load in which the tire is mounted on a normal rim and is filled with a normal internal pressure. The normal rim means a "standard rim" in the JATMA Standards, a "design rim" in the TRA Standards, and a "measuring rim" in the ETRTO Standards. The normal internal pressure means the "maximum air pressure" in the JATMA Standards, the "maximum value" specified in "tire load limits at various cold inflation pressures" in the TRA Standards, and an "inflation pressure" in the ETRTO Standards. The tire-cross-sectional width is obtained at a position at which the outer wall surface 2a of the sidewall portion 2 is farthest away from the tire equatorial plane E in a tire-axial direction. In addition, the outer wall surface 2a of the sidewall portion 2 is a region of an outer wall surface of a main body of the sidewall portion 2 except for protrusions such as the protrusions 11, 12, and 13, or a protrusion indicating characters, or a design protrusion, and has a cross-sectional shape through the meridian that is defined to be formed of a plurality of arcs which are smoothly connected.

The second protrusion 12 is provided with a connection portion 15 that extends in the tire-circumferential direction and is connected to the first protrusion 11 on the outer side in the tire-radial direction, and a pair of radial projection portions 16 and 16 that projects outward from the connection portion 15 in the tire-radial direction.

Figure 4:
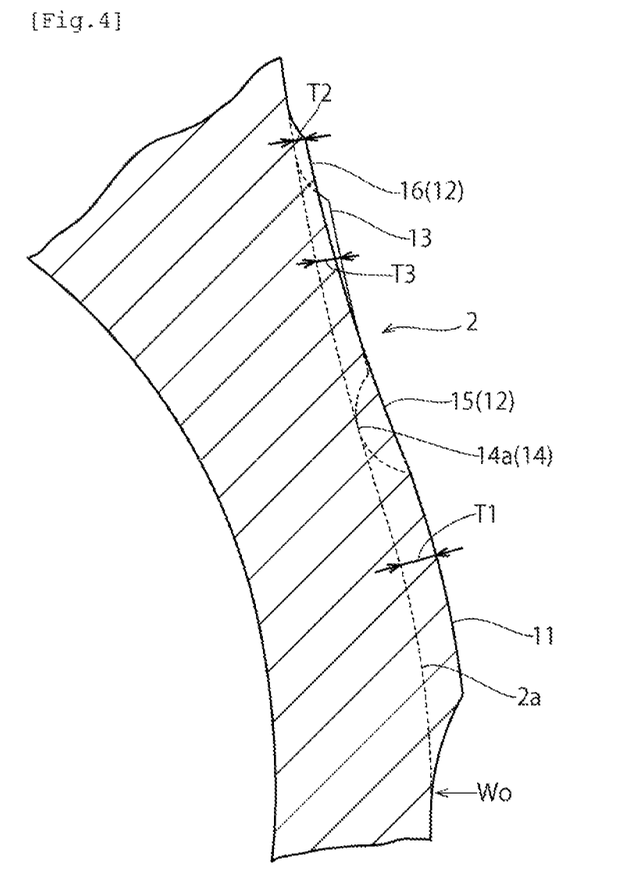
FIG. 4 is a section view: taken along line A-A in FIG. 2.
Figure 5:
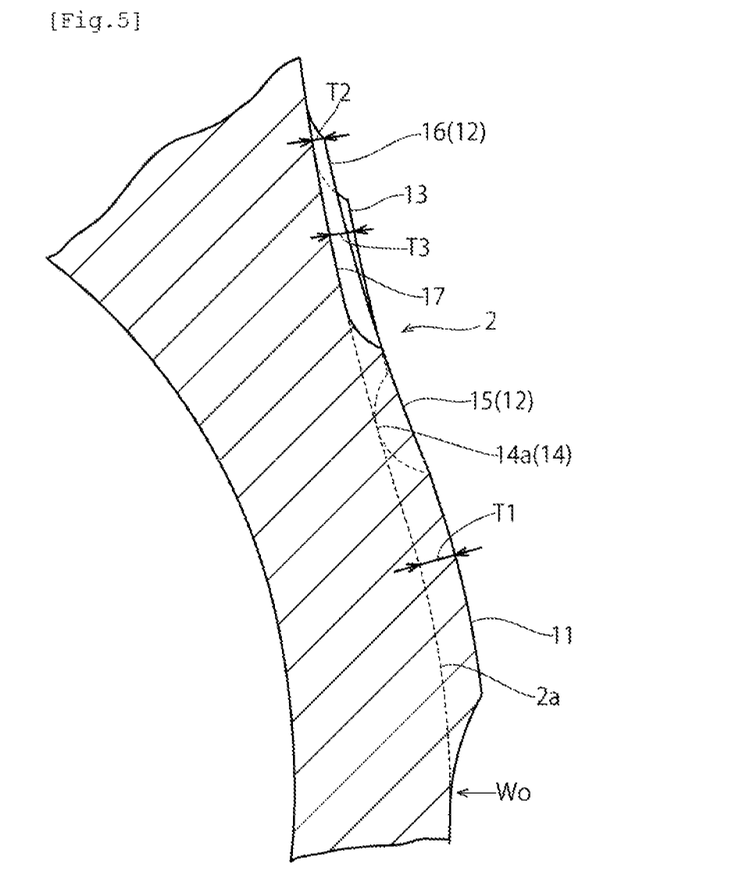
FIG. 5 is a section view taken along line B-B in FIG. 2.

As illustrated in FIGS. 4 and 5, the connection portion 15 is a protrusion having an arc shape that is connected to an outer side of the first protrusion 11 in the tire-radial direction. An outer surface of the connection portion 15 is smoothly connected to an outer surface of the first protrusion 11. The radial projection portion 16 projects outward in the tire-radial, direction from both end portions of the connection portion 15 in the tire-circumferential direction at an interval in the tire-circumferential direction. The radial projection, portion 16 extends outward from the third protrusion 13 in the tire-radial direction. In other words, the radial projection portion 16 extends from the third protrusion 13 to a position approaching the shoulder block rows 32 and 32.

The second protrusion 12 is provided with a recess portion 17 that is recessed inward in the radial direction and is comparted by the connection portion 15 and the pair of radial projection portions 16. The radial projection portion 16 has a tapered shape having a length in the tire-circumferential direction that is shortened as the radial projection portion is closer to the outer side thereof in the tire-radial direction. In this manner, the recess portion 17 or the gap portion 14, which is provided to be adjacent to the radial projection portion 16 in the tire-circumferential direction, has a shape having a length in the tire-circumferential direction that gradually increases as the recess portion or the gap portion is closer to the outer side thereof in the tire-radial direction.

In this example, the second protrusion 12 has the same raised height T1 as the first protrusion 11 on the inner side of the connection portion 15 in the tire-radial direction that is connected to the first protrusion 11. The raised heights of the connection portion 15 and the radial projection portion 16 gradually decrease as the portions are closer to the outer side thereof in the tire-radial direction. In other words, a raised height T2 of an outer end of the radial projection portion 16 in the tire-radial direction from the outer wall surface 2a of the sidewall portion 2 is set to be lower than the raised height T1 of the first protrusion 11. The second protrusion 12 has a raised height that gradually decreases as the second protrusion is closer to the outer side thereof in the tire-radial direction.

In this example, the radial projection portions 16 of the second protrusion 12 overlap, in the tire-circumferential direction at intervals in the tire-radial direction, the transverse grooves 7 that compart the shoulder block rows 32 in the tire-circumferential direction which are provided in the tread rubber 6. In other words, the radial projection portions 16 are provided to correspond to the plurality of transverse grooves 7 such that the transverse grooves 7 are opposite to the radial projection portions 16 in the tire-radial direction.

The third protrusion 13 provided in the gap portion 14 is disposed to be separated outward from the first protrusion 11 in the tire-radial direction, and is disposed to be separated from the second protrusion 12 in the tire-circumferential direction. A concave groove 14a, which configures a part of the gap portion 14, is formed to be comparted between the first protrusion 11 and the third protrusion 13. In addition, a concave groove 14b, which configures a part of the gap portion 14, is formed to be comparted between the second protrusion 12 and the third protrusion 13.

Figure 3:
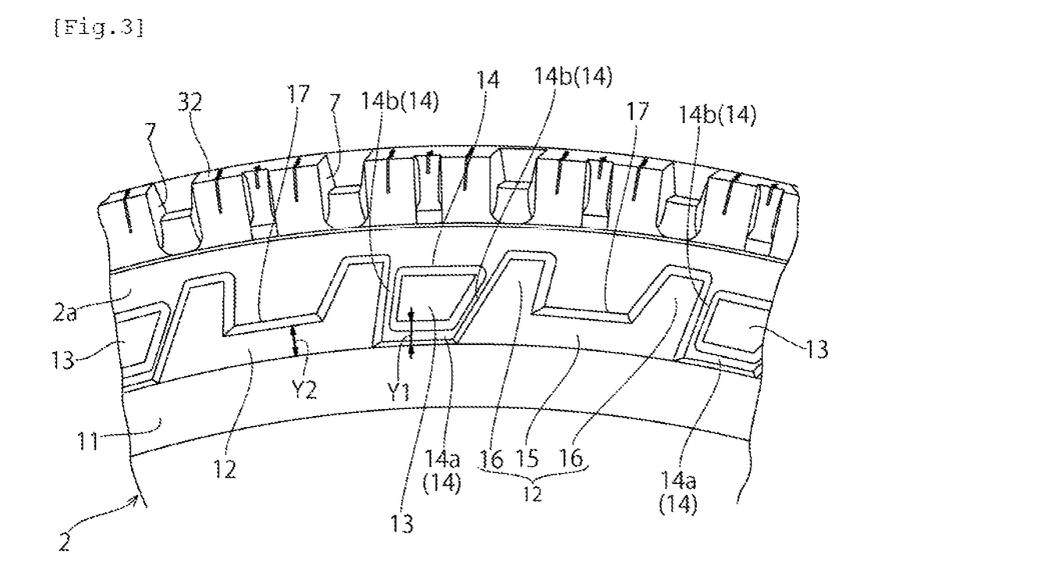
FIG. 3 is a side view illustrating main parts of the pneumatic tire in FIG. 1.

An end portion of the third protrusion 13 on an inner side in the tire-radial direction, which is opposite to the first protrusion 11 with the concave groove 14a interposed between the third protrusion 13 and the first protrusion, is positioned inward in the tire-radial direction from an end portion of the connection portion 15 of the second protrusion 12 on an outer side in the tire-radial direction. In other words, a groove width Y1 of the concave groove 14a is set to be smaller than a length Y2 of the connection portion 15 of the second protrusion 12 in the tire-radial direction (refer to FIG. 3).

The third protrusion 13 extends outward in the tire-radial direction substantially in parallel with the radial projection portion 16 of the second protrusion 12 that is opposite to the third protrusion with the concave groove 14b interposed therebetween. In this manner, the third protrusion 13 has a shape having a length in the tire-circumferential direction that increases as the protrusion is closer to the outer side thereof in the tire-radial, direction (that is, is widened, as the protrusion is closer to the outer side thereof in the tire-radial direction).

Figure 6:
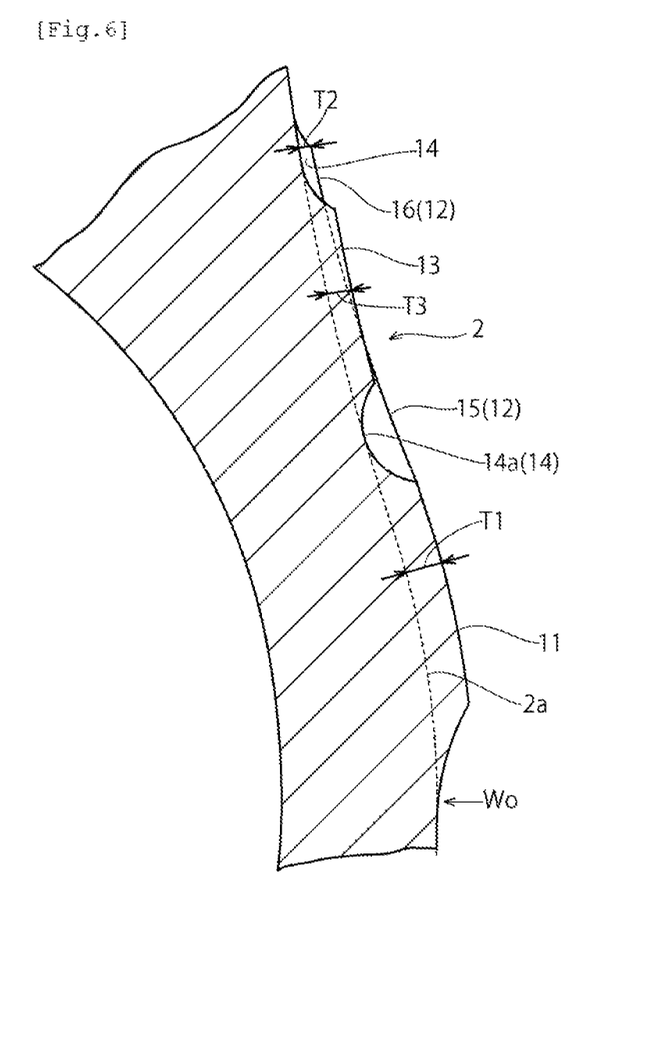
FIG. 6 is a section view taken along line C-C in FIG. 2.

The third protrusion 13 has a raised height T3 from the outer wall surface 2a of the sidewall portion 2 and is provided to have substantially constant sizes without a change in the tire-radial direction and in the tire-circumferential direction. In this example, the raised height T3 of the third protrusion 13 is set to be lower than the raised height T1 of an end portion of the second protrusion 12 on an inner side in the tire-radial direction, and to be higher than the raised height T2 of the end portion of the second protrusion 12 on the outer side in the tire-radial direction. In this manner, an outer surface of the second protrusion 12 intersects with an outer surface of the third protrusion 13 in a sectional view as illustrated in FIGS. 4 to 6.

In the pneumatic tire T according to the embodiment having such a configuration as described above, the annular first protrusion 11, which extends to be continuous in the tire-circumferential direction, is provided within the region X that is set in the vicinity of the tire-maximum-width position Wo. Therefore, it is possible to protect a portion in the vicinity of a position at which the tire maximum width is obtained and which is likely to be damaged by an external force applied to the sidewall portion, and thus it is possible to improve external damage resistance.

In addition, in the embodiment, the plurality of second protrusions 12 are provided with the radial projection portions 16 that project outward in the tire-radial direction and are provided on the outer side of the first protrusion 11 in the tire-radial direction. The pneumatic tire T sinks into a soft roadway such as muddy terrain due to a weight of a vehicle, the second protrusions 12 and the third protrusions 13 buried in the mud come into pseudo-contact with the ground. Therefore, the traction is generated during tire rolling by the second protrusions 12 or the third protrusions 13, and thus it is possible to improve drive performance on the muddy terrain.

Moreover, since the second protrusion 12 is provided with the radial projection portions 16 that are connected to the arc-shaped connection portion 15 connected to the first protrusion 11 provided to have the annular shape, the radial projection portion 16 has high rigidity, compared to a case where a protrusion that is separated from the first protrusion 11 and extends in the tire-radial direction. In this manner, large traction is likely to be generated and cracks are unlikely to be generated in the second protrusion 12, and thus it is possible to improve the external damage resistance.

In addition, in the embodiment, the radial projection portion 16 has the tapered shape having a length in the tire-circumferential direction that increases as the radial projection portion is closer to the outer side thereof in the tire-radial, direction. Therefore, the mud caught by the radial projection portions 16 during the driving on the muddy terrain is easily discharged, and thus it is possible to maintain high traction performance.

In addition, in the embodiment, the third protrusion 13 is provided in the gap portion 14 comparted between the second protrusions 12 adjacent to each other in the tire-circumferential direction and is disposed to be separated outward from the first protrusion 11 in the tire-radial direction. Therefore, it is possible to have uniform rigidity in the tire-circumferential direction in the vicinity of the second protrusion 12, the tire is unlikely to be locally deformed when the tire comes into contact with the ground, and thus cracks are unlikely to be generated.

In particular, the third protrusion 13 is provided to have the length in the tire-circumferential direction that increases as the third protrusion is closer to the outer side thereof in the tire-radial direction, or the end portion of the third protrusion 13 on the inner side in the tire-radial direction is positioned to be closer to the inner side in the tire-radial direction than the end portion of the connection portion 15 of the second protrusion 12 on the outer side in the tire-radial direction. In this manner, it is possible to further obtain the uniform rigidity in the tire-circumferential direction in the vicinity of the second protrusion 12, and thus it is possible to effectively reduce an occurrence of the cracks.

In addition, in the embodiment, the second protrusion 12 has the raised height that gradually decreases as the second protrusion is closer to the outer side thereof in the tire-radial direction. Therefore, the mud caught by the radial projection portions 16 during the tire rolling is easily discharged, and thus it is possible to maintain high traction performance.

Moreover, the raised height $T3$ of the third protrusion 13 interposed between the radial projection portions 16 in the tire-circumferential direction is set to be lower than the raised height $T1$ of the end portion of the second protrusion 12 on the inner side in the tire-radial direction, and to be higher than the raised height $T2$ of the end portion of the second protrusion 12 on the outer side in the tire-radial direction. In this manner, the outer surface of the second protrusion 12 intersects with the outer surface of the third protrusion 13 in a tire-sectional view. Therefore, it is possible for both protrusions of the second protrusions 12 and the third protrusions 13 to effectively have the muddy caught, and thus large traction is likely to be generated.

In addition, in the embodiment, when a tire chain is mounted, the side chain disposed on the sidewall portion 2 comes into contact with the first protrusion 11 provided to have the continuous annular shape in the region X provided in the vicinity of the tire-maximum-width position Wo, and thus the side chain does not come into direct contact with the outer wall surface 2a of the sidewall portion 2. Therefore, it is possible to reduce damage to the sidewall portion 2 by the tire chain.

Moreover, in the embodiment, the radial projection portions 16 of the second protrusions 12 are provided to be opposite, in the tire-radial direction, to the transverse grooves 7 that compart the shoulder block rows 32 in the tire-circumferential direction. Therefore, a connector portion that connects a cross chain disposed on the tread portion 3 with the side chain disposed on the sidewall portion 2 is fitted into and fixed to the transverse groove 7. In addition, the side chain does not come into direct contact with the outer wall surface 2a of the sidewall portion 2 but comes into contact with the radial projection portion 16 and the connection portion 15. Thus, it is possible to reduce damage to the sidewall portion 2 by the tire chain.

The pneumatic tire of the invention is the same as a normal pneumatic tire except for the first protrusion 11, the second protrusions 12, and the third protrusions 13 on the outer wall surface of the sidewall portion as described above, and thus the invention can employ any materials, shapes, structures, manufacturing methods, or the like known in the related art.

The pneumatic tire of the invention has action, and effects described above and high drive performance on the muddy ground, and thus is applicable as an off-road tire having an aim at running on a rough road including the muddy terrain.

As described above, some embodiments of the invention are described; however, the embodiments are provided as only examples and are not provided to limit a scope to the invention on purpose. The embodiments can be realized in various other forms, and various omissions, replacements, or modifications of the embodiments can be performed within a range without departing from the gist of the invention. The embodiment or modified embodiments thereof are included in the scope or the gist of the invention, and, similarly, are included in the invention and the scope equivalent to the invention described in the claims.

EXAMPLE

In order to verify the effects of the embodiment, regarding a pneumatic tire having a tire size of 11R22.5, test tires for Examples and Comparative Examples were produced and evaluation of traction performance and crack resistance of the test tires was performed.

Specifically, Example 1 is a tire that is provided with the first protrusion and the second protrusions and is not provided with the third protrusion on the outer wall surface of the sidewall portion. Example 2 is a tire that is provided with the first protrusion, the second protrusions, and the third protrusions on the outer wall surface of the sidewall portion. Comparative Example 1 is a tire that is provided with the first protrusion and the third protrusions and is not provided with the second protrusion on the outer wall surface of the sidewall portion. Comparative Example 2 is a tire that is provided with the first protrusion and the second protrusions and is not provided with the third protrusion on the outer wall surface of the sidewall portion. Note that the entire tire configuration for the Examples and the Comparative Examples is the same except for the protrusions provided on the outer wall surface of the sidewall portion.

Evaluation methods are as follows.

1. Traction Performance

A test tire was mounted on a rim of 22.5×7.50, was filled with an internal pressure of 700 kPa, and was mounted on a vehicle having a prescribed loading capacity of 10 t, time taken to move forward by 20 m on the muddy terrain in a stopping state was measured, and measured values were indexed with the results of Comparative Example 1 as 100. An increase in an index indicates that arrival time taken to move forward by 20 m is shortened and thus the traction performance is high.

2. Crack Resistance

A test tire was mounted on a rim of 22.5×7.50, was filled with an infernal pressure of 708 kPa, and was mounted on a vehicle having a prescribed loading capacity of 10 t, the number of cracks generated in the sidewall portion was measured after driving of 20,000 km was performed, and a reciprocal of the measured value was indexed with the results of Comparative Example 1 as 100. An increase in an index indicates that small cracks are generated and thus the crack resistance is high.

TABLE 1

|  | Comparative Example 1 | Comparative Example 2 | Example 1 | Example 2 |
|---|---|---|---|---|
| Presence or absence of first protrusion | Presence | Presence | Presence | Presence |
| Presence or absence of second protrusion | Absence | Absence | Presence | Presence |
| Presence or absence of third protrusion | Presence | Absence | Absence | Presence |
| Traction performance | 100 | 92 | 111 | 116 |
| Crack resistance | 100 | 118 | 107 | 105 |

As shown in Table 1, the results verified that, in Comparative Example 2, the crack resistance was high; however, the traction performance was lower than that in Comparative Example 1. In comparison, in Examples 1 and 2, higher traction performance and crack resistance are exhibited than those in Comparative Example 1.

What is claimed is:

1. A pneumatic tire comprising:
a pair of bead portions;
a pair of sidewall portions which extends outward from the bead portions in a tire-radial direction; and
a tread portion which connects both outer ends of the sidewall portions to each other in the radial direction,
wherein an outer wall surface of the sidewall portion is provided with a first protrusion extending to have an annular shape in a tire-circumferential direction, and a plurality of second protrusions disposed at intervals in the tire-circumferential direction on an outer side of the first protrusion in the tire-radial direction,
wherein the first protrusion is provided, in the tire-radial direction, within a region having a range of 0 to 80% of a length H from a tire-maximum-width position to a tire-outermost-diameter point in the tire-radial direction with the tire-maximum-width position as the center, and
wherein the second protrusion is provided with a connection portion that extends in the tire-circumferential direction and is connected to the first protrusion on the outer side in the tire-radial direction, and a pair of radial projection portions that projects outward in the tire-radial direction from both end portions of the connection portion in the tire-circumferential direction and is disposed at an interval in the tire-circumferential direction.

2. The pneumatic tire according to claim 1, wherein a length of the radial projection portion in the tire-circumferential direction is shortened as the radial projection portion is closer to the outer side thereof in the tire-radial direction.

3. The pneumatic tire according to claim 1, wherein an outer wall surface of the sidewall portion is provided with a third protrusion disposed between the second protrusions adjacent to each other in the tire-circumferential direction so as to be separated outward in the tire-radial direction from the first protrusion.

4. The pneumatic tire according to claim 3, wherein a length of the third protrusion in the tire-circumferential direction increases as the third protrusion is closer to the outer side thereof in the tire-radial direction.

5. The pneumatic tire according to claim 3, wherein an end portion of the third protrusion on an inner side in the tire-radial direction is positioned inward in the tire-radial direction from an end portion of the connection portion on an outer side in the tire-radial direction.

6. The pneumatic tire according to claim 1, wherein the second protrusion has a raised height from the outer wall surface of the sidewall portion that gradually decreases as the second protrusion is closer to the outer side thereof in the tire-radial direction.

7. The pneumatic tire according to claim 3, wherein an outer surface of the second protrusion intersects with an outer surface of the third protrusion in a tire-sectional view.

8. The pneumatic tire according to claim 2, wherein an outer wall surface of the sidewall portion is provided with a third protrusion disposed between the second protrusions adjacent to each other in the tire-circumferential direction so as to be separated outward in the tire-radial direction from the first protrusion.

9. The pneumatic tire according to claim 4, wherein an end portion of the third protrusion on an inner side in the tire-radial direction is positioned inward in the tire-radial direction from an end portion of the connection portion on an outer side in the tire-radial direction.

10. The pneumatic tire according to claim 1,
wherein the first protrusion has a substantially constant height from the outer wall surface of the sidewall portion in the tire-radial direction.

11. The pneumatic tire according to claim 1,
wherein the first protrusion has a height (T1) from the outer wall surface of the sidewall portion in the tire-radial direction and the second protrusions have the same height (T1) on an inner side of the connection portion in the tire-radial direction that is connected to the first protrusion.

12. The pneumatic tire according to claim 11, wherein raised heights of the connection portion and the radial projection portions of the second protrusions both gradually decrease towards an outer side in the tire-radial direction.

13. The pneumatic tire according to claim 6, wherein raised heights of the connection portion and the radial projection portions of the second protrusions both gradually decrease towards an outer side in the tire-radial direction.

14. The pneumatic tire according to claim 13, wherein the first protrusion has a height (T1) from the outer wall surface of the sidewall portion in the tire-radial direction and the second protrusions have the same height (T1) on an inner side of the connection portion in the tire-radial direction that is connected to the first protrusion.

\* \* \* \* \*